United States Patent [19]
Von Bodungen et al.

[11] 3,957,919
[45] May 18, 1976

[54] THERMOPLASTIC ELASTOMER COMPOSITION AND METHOD FOR PREPARATION

[75] Inventors: George A. Von Bodungen; Curtis L. Meredith, both of Baton Rouge, La.

[73] Assignee: Copolymer Rubber & Chemical Corporation, Baton Rouge, La.

[22] Filed: Sept. 24, 1974

[21] Appl. No.: 508,826

[52] U.S. Cl. .................... 260/897 A; 260/33.6 AQ; 260/42.33
[51] Int. Cl.² ......................................... C08L 23/16
[58] Field of Search ................................ 260/897 A

[56] References Cited
UNITED STATES PATENTS

| | | | |
|---|---|---|---|
| 3,256,366 | 6/1966 | Corbelli | 260/897 |
| 3,256,367 | 6/1966 | Jayne | 260/897 |
| 3,515,775 | 6/1970 | Combs et al. | 260/897 |
| 3,806,558 | 4/1974 | Fischer | 260/897 A |

Primary Examiner—Carman J. Seccuro
Attorney, Agent, or Firm—McDougall, Hersh & Scott

[57] ABSTRACT

A thermoplastic elastomer formed by an EPDM interpolymer, an uncross-linked polyethylene and an uncross-linked polymer of a monoolefin containing 3 to 16 carbon atoms and preferably polypropylene and in which the polyethylene component is present in an amount of at least 4% and preferably 5–15% by weight of the combined weight of the polymeric material and which are simultaneously subjected to hot working and a free radical reaction.

33 Claims, No Drawings

THERMOPLASTIC ELASTOMER COMPOSITION AND METHOD FOR PREPARATION

This invention relates to a class of materials referred to as thermoplastic elastomers and to a method and composition for the production of same.

Such thermoplastic elastomers can be molded by conventional techniques for molding thermoplastic resinous materials, such as by extrusion, screw, injection, or blowmolding, compression molding, calendering, vacuum forming and the like, without the need for vulcanization or cure to produce a molded product which retains the desired shape and which exhibits elastomeric characteristics.

In U.S. Pat. No. 3,758,643, issued Sept. 11, 1973, and entitled "Thermoplastic Blend of Partially Cured Monoolefin Copolymer Rubber and Polyolefin Plastic", description is made of thermoplastic elastomers generally and particularly to a thermoplastic elastomer formed of a monoolefin copolymer, such as ethylene-propylene (EPM), or terpolymer of ethylenepropylene-polyene (EPDM), in which the EPM or EPDM is first partially cured and then blended with a polyolefin resin such as polypropylene.

It is known that free radicals form during use of peroxide catalysts. Polypropylene is higly suceptible to free radical attack and can be severely degraded in the presence of such free radicals. Such degradation of the polypropylene component has been found to have noticeable effect on the molded thermoplastic elastomer easily is easly detected by the melt flow index (MFI).

It has been found, in accordance with the practice of this invention, that polyethylene has the effect of sufficiently protecting the polypropylene from degradative free radical attack whereby the need for partial cure in advance of the combination with polypropylene can be eliminated thereby to enable the EPM or EPDM and polypropylene to be blended directly in forming a thermoplastic elastomer which can be molded to the shape of the final product. While the EPDM, like polyethylene, is not subject to extensive degradation by scission during the free radical reaction in the presence of peroxide catalysts, the EPDM does not have an effect similar to that of polyethylene which protected the degradation of polypropylene. The desired effect is secured when at least 4% of the polymeric material is polyethylene while the remainder is EPDM and polypropylene, or polypropylene and other polyolefin having from 3 to 16 carbon atoms, but it is preferred to make use of an amount of polyethylene within the range of 5-15% by weight of the polymeric material of the compounded thermoplastic elastomer.

In addition to the protection of the polypropylene compound from free radical degradation, the presence of polyethylene as an essential part of the polyolefin resinous component unexpectedly contributes to the development of a number of other properties important to the physical and mechanical characteristics of the thermoplastic elastomer such as (1) a more uniform dispersion of the various components making up the thermoplastic elastomer, (2) the preparation of a thermoplastic elastomer in which the particle size is unexpectedly smaller, and (3) better surface smoothness in products molded of the thermoplastic elastomer.

The significant decrease in degradation of the polypropylene or other polyolefn of 3 to 16 carbon atoms, by reason of the presence of polyethylene, results in noticeable improvement in the ease of manufacture of the thermoplastic elastomer better processability of the thermoplastic elastomer during the molding of the finally shaped products, and lower compression set in the thermoplastic elastomeric product that is formed.

The thermoplastic elastomeric materials of this invention are prepared by the admixture of the EPDM interpolymer and the polyolefin resinous components in the ratio of 10–90 parts by weight of the EPDM to 90–100 parts by weight of the polyolefin resinous component and preferably 40–70 parts by weight of the EPDM interpolymer to 30–60 parts by weight of the polyolefin resinous component, with at least 4–15% by weight of the polymeric material comprising polyethylene with the remainder polyolefins of 3 to 16 carbon atoms and preferably polypropylene.

The polyethylene component can be either a low density polyethylene (e.g. .910 – .925 g/cc), medium density polyethylene (e.g. .925 –940 g/cc), or high density polyethylene (e.g. 0.941 - 0.965 g/cc), whether prepared by a high pressure process or a low pressure process and including linear polyetylene and copolymers of ethylene containing 10% or less of copolymerized alpha-olefins having 3 to 16 carbon atoms.

The polypropylene, the preferred polyolefin resin, may be a highly crystalline isotactic or syndyotactic polypropylene. Also, the polypropylene may be a copolymer or a block copolymer containing minor amounts of an alpha-olefin comonomer of 3 to 16 carbon atoms. Frequently the density of polypropylene is from 0.800 – 0.980 g/cc. Largely isotactic polypropylene, havng a density of from 0.900 – 0.910 g/cc is preferably employed.

The EPDM interpolymers and their method of manufacture are now well known to the skilled in the art. They are, in general, prepared by the interpolymerization of a monomeric mixture containing 10–90 (preferably 5595) mole percent ethylene and 90–10 (preferably 5-45) mole percent of at least one other straight chained monoolefin containing 3 to 16 carbon atoms (preferably propylene) and a polyene hydrocarbon in solution in an organic polymerization solvent, and in the presence of a Ziegler type catalyst. The preparation of such EPDM terpolymers is disclosed in U.S. Pats. No. 2,933,480, No. 3,093,620, No. 3,211,709, No. 3,113,115, and No. 3,300,450.

Examples of polyenes include non-bridged ring monomers such as 1,4-hexadiene, hexadiene, but it is preferred to make use of polyunsaturated derivatives of bicyclo-(2,2,1)-heptane bridged rings, such as dicyclopentadiene, bicyclo (2,2,1)hepta-2,5-diene, the alkylidene norbornenes, and especially the 5-alkylidene-2-norbornenes wherein the alkylidene group contains 1 to 20 carbon atoms and preferably 1 to 8 carbon atoms, the alkenyl norbornenes, and espcially the 5-alkenyl-2-norbornenes wherein the alkenyl group contains about 3 to 20 carbon atoms and preferably 3 to 10 carbon atoms. Other bridged ring hydrocarbons include polyunsaturated derivatives of bicyclo-(2,2,2)-octane as represented by bicyclo(2,2,2)octa-2,5-diene, polyunsaturated derivatives of bicyclo(3,2,1)-octane, polyunsaturated derivatives of bicyclo-(3,3,1)-nonane, and polyunsaturated derivatives of bicyclo-(3,2,2)-nonane. At least one double bond is present in a bridged ring of the above compounds, and at least one other double bond is present in a bridged ring or in a side chain. Specific examples of bridged ring compounds include 5-methylene-2-norbornene, 5-ethylidene-2-norbornene, 5-isopropylidene-2-norbornene, dicyclopentadiene, the methyl butenyl norbornenes such as 5-(2-methyl-2-butenyl)-2-norbornene, or 5-(3-methyl-2-butenyl)-2-norbornene and 5-(3,5dimethyl-4-hexenyl)-2-norbornene.

For description of the preparation of an EPDM interpolymer having a molecular ratio of ethylene to propylene in the range of 84:16 and an amount of 5-ethylidene-2-norbornene to provide an unsaturation level of about 5 carbon to carbon double bonds per 1000 carbon atoms, reference can be made to Example VI in the copending application Ser. No. 346,078, filed Mar. 29, 1973, corresponding to the EPDM identified as EPsyn 5509 in the accompanying examples. For description of the preparation of an EPDM having an ethylene to propylene mole ratio of 90:10, with an unsaturation level of 2 carbon to carbon double bonds per 1000 carbon atoms, derived from the polyene monomer 5-ethylidene-2-norbornene, reference can be made to Example VII of the aforementioned copending application. For the preparation of an EPDM rubber in which the ethylene to propylene ratio is 60:50 and the bound 5-ethylidene-2-norbornene is in an amount to provide 14 carbon to carbon double bonds per 1000 carbon atoms, reference can be made to Example I of the aforementioned copending application.

The thermoplastic elastomers of this invention are prepared in a one step process in which the EPDM polymer, polyethylene and polypropylene or other polyolefin are subjected to working along with a free radical generating agent, as represented by a peroxide such as dicumyl peroxide. The working step to effect cross-linking between the various polymers and interpolymers can be carried out as a part of the molding operation, such as during extrusion, injection molding, compression molding or the like, or it can be carried out as a separate working step, as in a Brabender, hot rolls, Banbury or other not masticating device. The free radical reaction, as by hot working can be carried out as a batch operaton by feeding the materials in to a Brabender or Banbury or injection molding device, or as a continuous or semi-continuous operation by continuously feeding the materials in the desired ratios onto hot working rolls or into a continuous extrusion machine.

As the free radical generating agent, any conventional curvative may be employed, including such free radical generating agents or cross-linking agents as the peroxides, whether aromatic or aliphatic as in the aromatic diacyl peroxides and aliphatic diacyl peroxides, dibasic acid peroxides, ketone peroxides, alkyl peroxyesters, alkyl hydroperoxides, e.g. diacetylperoxide, dibenzoylperoxide, bis-2,4-dichlorobenzoylperoxide, di-tertbutyl peroxide, dicumylperoxide, tert-butylperbenzote, tertbutylcumylperoxide, 2,5-bis(tert-butyl-peroxy)-2-5-dimethylhexane, 2,5-bis(tert-butylperoxy)-2,5-dimethylhexane-3,4,4,4'-tetra-(tert-butylperoxy)-2,2-dicyclohexylpropane, 4-bis(tert-butylperoxyisopropyl)-benzene, 1,1-bis-(tert-butylperoxy)-3,3,5-trimethylcyclohexane, lauryl peroxide, succinic acid peroxide, cyclohexanone peroxide, tert-butyl peracetate, butyl hydroperoxide, etc. Also suitable are the azide types of curing agents including such materials as the azidoformates (e.g., tetramethylenebis(axidoformate); for others see U.S. Pat. No. 3,284,421, Breslow Nov. 8, 1965), aromatic polyamides (e.g. 4,4'-diphenylmethan diazide; for others see U.S. Pat. No. 3,297,674, Breslow et al., Jan. 10, 1967), and sulfonazides such as p,p'-oxybis(benzene sulfonyl azide), etc. Also, co-curing agents such as trimethylol propane, trimethacrylate, triallylphosphate and divinyl benzene can be used to advantage.

The desired amount of free radical reaction is obtained when use is made of a peroxide, such as dicumyl peroxide, in an amount within the range of 0.05% to 4% by weight of the EPDM, and preferably in an amount within the range of 0.1% to 2.0% by weight, with others of the catalysts being used in corresponding amounts, when calculated on the molecular basis. The reaction time and temperature is calculated to be at least three times the half-life of the catalyst employed and preferably five to six times the half-life, except that the minimum reaction temperature is that at which the polyethylene or the polyolefin is reduced to a molten state. In general, it is desirable to make use of a reaction temperature for cross-linking within the range of 325°–425°F. When, for example, dicumylperoxide has a half-life of five minutes at 300°F, this means that 50% of the peroxide will decompose in five minutes at such temperature. When the reaction is continued for five to six times the half-life, it is calculated that about 97% of the peroxide will have been consumed. Under these conditions, free radical generating agent is no longer available in amount sufficient to continue the reaction so that the resulting thermoplastic elastomer is not subject to further reaction and thus remains stable during subsequent molding or re-molding without further cure.

Thus the free radical generating agent is substantially completely exhausted so that there is little or no tendency for further advancement of reaction subsequently to take place. It is sometimes desirable to insure termination of the action of any remaining free radical generating agent, by adding to the mix at this stage, a small amount of a free radical scavenging agent, such as a stabilizer or anti-oxidant. Any conventional anti-oxidant or stabilizer can be used, such as amine types, phenolic types, sulphide, phenol alkanes, phosphites and the like.

There is reason to believe that, in the course of the decomposition of the free radical generating agent, some degree of grafting of the polyethylene and possibly some of the polypropylene onto the EPDM interpolymer takes place in addition to the free radical reaction of the polymeric material. Such grafting has been found materially to improve the compatibility of the materials, as well as to provide for others of the improvements in physical and mechanical properties, such as more uniform dispersion, smaller particle size, and better surface finish in the final product, as well as improved processability of the formed thermoplastic elastomer.

In many plastic and elastomeric molding or forming operations, a considerable amount of scrap is produced. Such scrap produced from the thermoplastic elastomers embodying the features of this invention may be chopped and re-used one or more times with little significant deterioration in appearance, processing characteristics or others of its physical and mechanical properties. The articles which may be produced from the thermoplastic elastomers of this invention are quite numerous including extruded insulation on wire, gaskets, flexible tubing, balls, weatherstripping, flexible bumpers and other automotive parts and the like.

Having described the basic concepts of this invention, illustration will now be made by way of the following examples which are given by way of illustration, and not by way of limitation.

EXAMPLES 1 – 36

In the following examples, the EPDM interpolymer, polyethylene and polypropylene were reduced to small segments, such as crumb, and introduced in the prescribed amounts with the peroxide or other catalyst, in powder form, into a Brabender batch mixer or an extruder operating at a temperature of 375°F for working five to six times the half-life of the peroxide.

The resulting material was cooled and then extruded into test rods or injection molded into test devices for conventional comparative tests, such as flexure, modulus, tensile strength, percent elongation, melt flow index (MFI), spiral flow, compression set in percent at 70°C, paint adhesion and Shore D hardness. The ingredients and their amounts are identified for each example in the following tabulation along with the results on the test pieces formed thereof.

| Example | % Rubber (Type) | % PE (Type) | % PP (Type) | phr peroxide | | curing co-agent | Flex. Mod. (PSI) | Tensile (PSI) | Elong. (%) |
|---|---|---|---|---|---|---|---|---|---|
| 1 | 60 (70A) | 10 A | 30 D | 0.25 | (Dicup) | | 33,325 | 1050 | 90 |
| 2 | 60 (70A) | 10 A | 30 D | 0.50 | (Dicup) | | 27,950 | 1050 | 70 |
| 3 | 60 (70A) | 10 A | 30 D | 0.25 | (Dicup) | | 30,100 | 1100 | 60 |
| 4 | 60 (70A) | 10 A | 30 D | 0.50 | (Dicup) | | 27,950 | 1050 | 70 |
| 5 | 40 (70A) | 10 A | 50 D | 0.50 | (Dicup) | | 68,800 | 1750 | 40 |
| 6 | 50 (70A) | 10 A | 40 D | 0.50 | (Dicup) | | 44,075 | 1325 | 60 |
| 7 | 60 (70A) | 10 A | 30 D | 0.50 | (Dicup) | | 25,800 | 1000 | 80 |
| 8 | 70 (70A) | 10 A | 20 D | 0.50 | (Dicup) | | 10,750 | 850 | 90 |
| 9 | 60 (55) | 10 A | 30 D | 0.5 | (Dicup) | | 21,500 | 950 | 150 |
| 10 | 60 (7506) | 10 A | 30 D | 0.5 | (Dicup) | | 21,500 | 900 | 230 |
| 11 | 60 (5509) | 10 A | 30 D | 0.5 | (Dicup) | | 30,100 | 1925 | 460 |
| 12 | 60 (5508) | 10 A | 30 D | 0.5 | (Dicup) | | 21,500 | 1200 | 320 |
| 13 | 60 (3506) | 10 A | 30 D | 0.5 | (Dicup) | | 21,500 | 850 | 190 |
| 14 | 60 (4506) | 10 A | 30 D | 0.5 | (Dicup) | | 21,500 | 850 | 220 |
| 15 | 60 (40A) | 10 A | 30 D | 0.5 | (Dicup) | | 19,350 | 750 | 160 |
| 16 | 60 (70A) | 8 A | 32 D | 0.1 | (Dicup) | | 32,250 | 1175 | 70 |
| 17 | 60 (70A) | 6 A | 34 D | 0.1 | (Dicup) | | 36,550 | 1100 | 80 |
| 18 | 60 (70A) | 4 A | 36 D | 0.1 | (Dicup) | | 40,850 | 1100 | 70 |
| 19 | 60 (70A) | 2 A | 38 D | 0.1 | (Dicup) | | 43,000 | 1100 | 50 |
| 20 | 60SK43B | none | 40 E | 0.5 | (Dicup) | | 36,550 | 1050 | 90 |
| 21 | 60SK43B | 10 A | 30 E | 0.5 | (Dicup) | | 22,575 | 900 | 100 |
| 22 | 60 (70A) | 10 A | 30 D | 0.5 | (Varox) | | 21,500 | 875 | 160 |
| 23 | 60 (70A) | 10 A | 30 D | 0.5 | (Lupersol 231) | | 38,700 | 1250 | 50 |
| 24 | 60 (70A) | 10 A | 30 D | 1 | (Dicup) | 3 (SR350) | 25,800 | 1175 | 140 |
| 25 | 60 (70A) | 10 A | 30 D | 2 | (Dicup) | 3 (SR350) | 27,950 | 1350 | 130 |
| 26 | 60 (70A) | 10 A | 30 D | 0.075 | (ME Tuads) | 0.15 (MBT) | 32,250 | 1050 | 50 |
| 27 | 60 (70A) | 10 A | 30 D | 0.0375 | (ME Tuads) | 0.075 (MBT) | 29,025 | 950 | 50 |
| 28 | 60 (70A) | 10 A | 30 D | 0.01 | (MBT) | 0.15 (Spider S) | 33,325 | 1150 | 80 |
| 29 | 60 (70A) | 10 A | 30 D | 0.05 | (MBT) | 0.075 (Spider S) | 31,175 | 1100 | 70 |
| 30 | 60 (70A) | 10 A | 30 D | 1 | (Dicup) | | 31,275 | 1025 | 80 |
| 31 | 60 (70A) | | 40 D | 1 | (Dicup) | | 49,450 | 1075 | 20 |
| 32 | 60 (70A) | 10 B | 30 D | 0.5 | (Dicup) | | 29,025 | 925 | 60 |
| 33 | 60 (70A) | 10 C | 30 D | 0.5 | (Dicup) | | 30,100 | 900 | 80 |
| 34 | 60 (70A) | 10 A | 30 D | 0.5 | (Dicup) | | 35,475 | 1400 | 80 |
| 35 | 60 (70A) | 10 A | 30 F | 0.5 | (Dicup) | | 19,350 | 900 | 140 |
| 36 | 60 (1470) | 10 A | 30 D | 0.4 | (Varox) | | 28,500 | 1100 | 100 |

| Example | 100% Tensile Mod. (PSI) | Cond.L MFI (g/10 min) | Spiral Flow (gms) | 70°C Comp. Set (%) | Paint Adhesion S / Copc | |
|---|---|---|---|---|---|---|
| 1 | — | 0.66 | | 83.1 | | ⎫ Rubber crosslinked in extrusion |
| 2 | — | 0.40 | | — | | |
| 3 | — | 0.73 | | 82.4 | | ⎬ Rubber crosslinked prior to extrusion |
| 4 | — | 0.40 | | — | | ⎭ |
| 5 | — | 4.1 | 9.8 | 86.2 | 3 / 4 | ⎫ |
| 6 | — | 0.98 | 7.3 | 75.1 | 6 / 6 | ⎬ Rubber concentration |
| 7 | — | 0.06 | 5.4 | 59.8 | 7 / 6 | |
| 8 | — | 0.00 | 3.0 | 43.5 | 9 / 7 | ⎭ |
| 9 | 950 | 0.14 | — | 65.4 | 6 / 7 | ⎫ |
| 10 | 900 | 0.14 | — | 68.9 | 6 / 8 | |
| 11 | 1425 | 0.04 | — | 77.5 | 6 / 3 | ⎬ Variations of EPDM composition |
| 12 | 1150 | 0.07 | — | 72.9 | 7 / 7 | |
| 13 | 850 | 0.42 | — | 69.4 | 8 / 8 | |
| 14 | 850 | 0.48 | — | 69.4 | 8 / 8 | ⎭ |
| 15 | 750 | 0.31 | — | 69.7 | 8 / 8 | ⎫ |
| 16 | — | 1.0 | — | 83.7 | 10/10 | ⎬ Effect of HDPE concentration |
| 17 | — | 1.0 | — | 84.2 | 10/10 | |
| 18 | — | 0.8 | — | 85.3 | 10/10 | |
| 19 | — | 1.0 | — | 86.1 | 10/10 | ⎭ |
| 20 | — | 0.50 | | 85.8 | 8 | ⎫ HDPE effect and reactor blending |
| 21 | 900 | 0.03 | | 59.6 | 6 | ⎭ |
| 22 | 875 | 0.1 | — | 66.2 | 7 / 9 | ⎫ Use of different peroxides |
| 23 | — | 0.25 | — | 76.1 | 7 / 9 | ⎭ |
| 24 | 1150 | 0.07 | — | 66.0 | 3 / 8 | ⎫ Use of curing co-agents |
| 25 | 1300 | 0.20 | — | 51.0 | 3 / 3 | ⎭ |
| 26 | — | 1.0 | 6.7 | 86.7 | 6 | |

-continued

| Example | % Rubber (Type) | % PE (Type) | % PP (Type) | phr | peroxide | curing co-agent | Flex. Mod. (PSI) | Tensile (PSI) | Elong. (%) |
|---|---|---|---|---|---|---|---|---|---|
| 27 | — | 1.0 | 6.8 | 88.0 | 6 | Sulfur curing | | | |
| 28 | — | 0.0 | 5.0 | 78.1 | 7 | | | | |
| 29 | — | 0.1 | 5.7 | 81.5 | 7 | | | | |
| 30 | | | 0.11 | 65.3 | | High peroxide level with and without HDPE | | | |
| 31 | | | 4.10 | 82.2 | | | | | |
| 32 | | | 0.3 | 71.8 | | | | | |
| 33 | | | 0.2 | 66.2 | | Use of LDPE | | | |
| 34 | — | | 0.0 | 57.0 | | * | | | |
| 35 | — | | 0.1 | 4.4 | 62.8 | ** | | | |
| 36 | — | — | | 6.1 | 74.2 | 8/ | | | |

A — High density polyethylene at melt flow index ~5 and specific gravity of 0.965
B — Low density polyethylene of melt flow index ~12 and specific gravity of 0.926
C — Low density polyethylene of melt flow index ~22 and specific gravity of 0.926
D — Isotactic polypropylene of melt flow index ~10 and specific gravity of 0.91
E — Isotactic polypropylene of melt flow index ~5 and specific gravity of 0.91
F — Copolymer of ethylene and propylene with melt flow index ~13.0
*Rubber, HDPE & peroxide extruded twice, mixed with PP and re-extruded
**Copolymer of ethylene and propylene In the foregoing tabulation, the portion within the parenthesis, under the column headed "% Rubber", has reference to the EPDM polymer used in the examples, which may be identified as follows:

| EPDM No. | $C_2/C_3$ | Unsaturation C=C | Polyene monomer | Mol.wt. distribution | Source | $ML_{(1+8)}$ |
|---|---|---|---|---|---|---|
| 55 | 66/34 | 9.0 | EN | 3.10 | Copolymer | 47 |
| 7506 | 68/32 | 5.3 | EN | 8.97 | " | 63 |
| 5509 | 84/16 | 5.0 | EN | 2.65 | " | 52 |
| 5508 | 78/22 | 5.0 | EN | 2.38 | " | 50 |
| 3506 | 64/36 | 4.0 | DCP | 7.16 | " | 34 |
| 4506 | 64/36 | 5.0 | EN | 5.42 | " | 36 |
| 40A | 67/23 | 4.4 | EN | 2.86 | " | 38 |
| 70A | 67/23 | 5.8 | EN | 2.49 | " | 68 |
| SK43B | 66/34 | 5.0 | EN | 2.50 | " | 70 |
| NORDEL 1470 | 66/34 | 5.4 | 1,4 hexadiene | 13.1 | DuPont | 74 |

In the above EN means 5-ethylidene 2-norbornene; DCP means dicyclopentadiene; Copolymer means Copolymer Rubber & Chemical Corporation of Baton Rouge, Louisiana.

In the tabulation, phr means parts per 100 parts by weight of EPDM; MBT means mercapto benzole thiazole; Dicup means dicumyl peroxide; TUADS means methyl urea disulphide; MFI means melt flow index.

In Examples 3 and 4, the EPDM is cross-linked prior to blending with the polyolefins, in accordance with the practice described in the aforementioned prior art U.S. Pat No. 3,758,643. This is to be compared with Examples 1 and 2, in which the same EPDM, polyethylene, polypropylene and dicumyl peroxide are separately added in the same amounts except for the Dicup for simultaneous free radical reaction during hot working, as in an extruder. In Examples 1 and 3, the amount of dicumyl peroxide was 0.25 parts per 100 parts by weight of EPDM and 0.5 parts per 100parts by weight of EPDM in Examples 2 and 4.

It will be seen that increase in the amount of peroxide has the effect of increasing the amount of grafting that takes place, as indicated by the lower melt flow index for the examples having the greater amounts of peroxide, resulting from the increase in molecular weight from grafting sufficient to more than offset the scission of the polypropylene chain by the peroxide.

In Examples 5 to 8, the amount of EPDM was varied from 40% by weight (Example 5) to 70% by weight (Example 8) at the expense of the amount of polypropylene, all other matters remaining the same. From the developed data, it will be seen that the values of flexure, tensile, elongation, melt flow index, spiral flow and compression set are conversely proportional to the amount of rubber while the important property of paint adhesion is directly proportional, with better adhesion being obtained with thermoplastic elastomers having the higher EPDM concentration.

Examples 9 to 15 are addressed to the utilization of EPDM interpolymers which differ in the polyene (third monomer), the ratio of ethylene to propylene in the interpolymer, the amount and type of unsaturation in the interpolymer, the molecular weight of the EPDM (as measured by viscosity), as well as the molecular weight distribution of the EPDM interpolymer.

Significantly important improvements in physical and mechaical properties, such as in flexure, tensile strength, and elongation, are experienced when the molecular ratio of ethylene to propylene in the EPDM interpolymer is above 70:30 and preferably above 75:25. This corresponds to the range at which the amount of crystallinity increases perceptively in the formed interpolymer to provide a highly crystalline EPDM.

In Examples 16 to 19, the materials and method of preparation are the same except that use is made of a high density polyethylene in amounts which are varied within the range of 2-8% by weight with corresponding reduction in the amount of low molecular weight polypropylene. The effect is an increase in the compression set with decrease in the amount of polyethylene and increase in the amount of polypropylene. As will be seen from the values secured with the thermoplastic elastomer prepared in Example 19, and more clearly in Examples 30 and 31, an excessive loss in elongation is experienced when the amount of polyethylene falls below 4% by weight in the interpolymer. Paint adhesion is exceptionally good with all of the thermoplastic elastomers produced in Examples 16 to 19.

It has been observed that the use of high density polyethylene gives improved dispersion of the EPDM interpolymer in the continuous phase of polypropylene, with corresponding greater uniformity and improved appearance of the formed thermoplastic elastomer.

Examples 20 and 21 are the same except that in Example 20 the polyethylene is replaced by polypropylene, with the entire amount of polypropylene being in the medium molecular weight range while in the Example 21 the polyethylene is of the type previously used in Examples 1 to 19. These two examples cearly establish the significance of the polyethylene component from the standpoint of improvement in dispersion and particle size, with a maximum of 350 microns in Example 5, while particles of over 1000 microns are obtained in the absence of polyethylene in Example 20. In addition, ribbon die extrudates from Example 21 are smoother and have a glossier surface with fewer blemishes by comparison with the extrudate produced with the thermoplastic elastomer of Example 20 in which polyethylene is absent. Of significance is the vast reduction in the melt flow index experienced with the composition of Example 21, having the high density polyetylene component.

In Examples 22 to 29, use is made of different peroxides, curing agents and vulcanizing agents added to the EPDM - polyethylene - polypropylene for cross-linking otherwise the compositions and methods for preparation were the same. In Examples 24 and 25, the amount of dicumyl peroxide is varied from one part per 100 in Example 24 to two parts per 100 parts of EPDM in Example 25, with Examples 24 and 25 also containing a co-curing agent, trimethylol propane trimethacrylate. In Example 22 the peroxide is 2,5-dimethyl-2,5-di t-butyl peroxyhexane, and in Example 23 the peroxide is 1,1-bis(t-butyl peroxy)3,3,5-trimethyl cyclohexane.

It will be apparent from Examples 22 to 29 that the thermoplastic elastomers can be prepared, in accordance with the practice of this invention, with the use of various peroxides alone or in combination with curing co-agents (Examples 24–25) or with sulphur cure (Examples 26–29).

Examples 32 and 33 are intended to show that low density polyethylene can be used as the polyethylene component in the preparation of thermoplastic elastomers in accordance with the practice of this invention.

Examples 30 and 31 yielded physical data which indicates that grafting takes place during the free radical reaction between the separate components. Examples 30 and 31 were the same except that Example 31 was run without high density polyethylene while Example 30 included 10% by weight polyethylene, and is representative of the practice of this invention. It will be seen that the melt flow index of Example 30 (with polyethylene) is 1/40th the level of Example 31 (without polyethylene). The high melt flow index of Example 31 can be explained by the drop in molecular weight of the polypropylene component due to chain scission, as effected by the peroxide, and in the absence of protection by the polyethylene. The lower melt flow index of Example 30 can further be explained by the occurrence of grafting of polyethylene which effectively raises the molecular weight of the blend, offsetting any drop in molecular weight of the polypropylene. The lower melt flow in Example 30 cannot be explained solely by cross-linking of the EPDM since cross-linking would be expected to cause poor dispersion. Observation of this sample showed improved dispersion which is consistent with the presence of a grafted species.

EXAMPLES 37 –45

The following Examples 37 - 45 are intended to show that grafting occurs between the EPDM and the mono-olefin polymers during free radical reaction in the presence of polyetylene, in accordance with the practice of this invention.

Composition in parts by weight:

| | |
|---|---|
| Example 37: | |
| EPDM EPsyn 70A | 60.0 |
| Varox | 0.3 |
| Agerite Geltrol | 0.6 |
| Example 38: | |
| Example 37 | 36.0 |
| Isotactic polypropylene | 18.0 |
| High density polyethylene | 6.0 |
| Example 39: | |
| EPDM (70A) | 36.0 |
| Isotactic polypropylene | 18.0 |
| High density polyethylene | 6.0 |
| Varox | 0.3 |
| Example 40: | |
| Isotactic polyrpopylene | 60.0 |
| Varox | 0.3 |
| Example 41: | |
| High density polyethylene | 60.0 |
| Varox | 0.3 |
| Example 42: | |
| EPsyn 70A EPDM | 36.0 |
| High density polyethylene | 24.0 |
| Varox | 0.3 |
| Example 43: | |
| EPsyn 70A EPDM | 36.0 |
| Isotactic polypropylene | 24.0 |
| Varox | 0.3 |
| Example 44: | |
| EPsyn 70A EPDM | 36.0 |
| Isotactic polypropylene | 18.0 |
| High density polyethylene | 6.0 |
| MBT | 0.036 |
| Spider sulphur | 0.054 |
| Example 45: | |
| Example 37 | 36.0 |
| Example 40 | 18.0 |
| Example 41 | 6.0 |

In the foregoing examples, the EPDM identified as EPsyn 70A is the same as described in the tabulation on page 11 of the specification. The isotactic polypropylene is defined by "D" following the table on page 10 of the specification and the high density polyethylene is defined by "A" on the same page. Varox is 2,5-bis(tert-butyl peroxy)-2,5-dimethyl hexane from R. T. Vanderbilt. Agerite Geltrol is phosphided polyalkyl polyphenol from R. T. Vanderbilt.

In Example 37, the EPsyn 70A and Varox were introduced into a Brabender Plasti-Corder at ambient temperature and then mixed while heated to a temperature of 400°F. Mixing was continued for an additional 6 minutes to insure substantially complete decomposition of the peroxide, and then the antioxidant was added, with working for an additional three minutes, to minimize any effect from decomposition of any residual remaining peroxide.

In Examples 38 and 45, the preparation is the same as in Example 37 except that the final steps of mixing for an additional three minutes is omitted in the absence of the addition of the anti-oxidant.

In the remainder of the examples 40 to 44, all of the ingredients were added to the Brabender Plasti-Corder at ambient temperature, mixed while heated to a temperature of 400°F and then mixed for an additional six minutes at 400°F.

The various samples were subjected to two different tests. In one test, the proportion of non-crosslinked EPDM was determined by dissolving finely cut films of each sample in xylene at about 130°–135°C. The sample concentration was accurately weighed to about one gram in 70 ml xylene. After each mixture cooled, the volume was adjusted to exactly 100 ml and each mixture was centrifuged.

The clear liquid phases were separated by decantation through a glass wool and cheese cloth filter and the solids contents were determined by evaporating measured aliquots of the cooled solutions. Corrections in soluble contents were made based on (1) previously determined solubilities for the polyethylene of 1.73% and for the polypropylene of 2.52%, and (2) target amounts of each plastic in a given blend. The results are reported as weight percent soluble EPDM in the following Table I.

The second test embodied a thorough extraction of each of three portions of each example in refluxing xylene. Weighed samples of fnely cut thin films were extracted for 2, 6 and 12 hours in 100 ml of xylene, using Soxhlet thimbles in glass extraction cups (ASTM D-297). The weight percent in solubles were determined by difference after washing each thimble by acetone extraction to remove xylene, drying the thimble containing insolubles in a 100°C vacuum oven, and reweighing. The results of these tests are summarized in Table I.

Additional tests were made to show that the following blends were completely soluble:
High density polyethylene plus Varox (Example 41)
Isotactic polypropylene plus Varox (Example 40)

A mixture of 60% of Example 37, 30% of Example 40, and 10% of Example 41 was extracted with refluxing and found to contain only 14.6 weight percent insoluble material.

Slides for microscopic studies of the above examples were prepared as follows:

A. For the fraction which was soluble in cold xylene, a small amount of solution was taken up in an eyedropper. Acetone was added to coagulate the polymer and the whole mixture was dropped onto a slide. The excess solvent was blotted with paper towels. The sides were air-oven dried at 50°C.

B. The portions which were insoluble in boiling xylene were pressed in a Carver press at 150°C under 20,000 psi. The resulting films were mounted on slides.

C. Micrographs were taken of the samples in polarized light at 38X. In all cases, the stage was rotated to display the maximum birefringence of the sample. Table II lists the light meter readings and exposure times for each micrograph as these data give a relative measure of the intensity of the birefringence. The lower light meter readings and shorter exposure times are indicative of highly birefringent samples. The relative amounts of birefringence observed are recorded in Table II.

The solubility data in Table I and the microscopy data in Table II support the following conclusions:

1. The polyethylene substantially protects the polypropylene from free radical attack. The absence of insolubles in Example 43 compared to 21.6% in Example 42 and 24.8% in Example 39 show that the insoluble content was enhanced by the presence of polyethylene.

2. Only slight birefringence observed in Example 38 indicated that crosslinked EPDM can be separated from polyolefins when mixed in a simple blend.

3. The high birefringence observed in Example 39 indicates that the polyolefins had grafted to the EPDM during the free radical reaction.

4. The low birefringence in Example 43 and the high birefringence in Example 42 indicates that the polyethylene was preferentially grafted to the EPDM rather than to the polypropylene.

TABLE I

| Example | Solubility Data Soluble EPDM (Wt. %) | Insolubles (Wt. %) |
|---|---|---|
| 37 | 70.4 | 31.7 |
| 38 | 43.6 | 16.1 |
| 39 | 35.7 | 24.8 |
| 40 | — | 0.0 |
| 41 | — | 0.0 |
| 42 | 33.8 | 21.6 |
| 43 | 54.4 | 0.4 |
| 44 | 60.3 | 0.4 |
| 45 | — | 14.6 |

TABLE II

Observations of Micrographs of TPE Compounds

| Example | Sample | Thickness mils | Light[1] Meter | Exposure Time | Birefringence | Film Type |
|---|---|---|---|---|---|---|
| 37 | 1A[2] | 9.0 | 100 | 2 min. | None | Polacolor 58 |
|  | B$_2$ | ~21.0[3] | >100 | 3 min. |  | Polacolor 58 |
|  | C[2] | — | — | 1 sec. | None | Black & White 57 |
| 38 | 2A | 5.3 | 90 | 2 min. |  | Polacolor 58 |
|  | B | ~28.0[3] | 80 | 2 min. | Slight | Polacolor 58 |
|  | C | — | — | 1 sec. | Slight | Black & White 57 |
| 39 | 1A | 6.0 | 88 | 2 min. |  | Polacolor 58 |
|  | B | 14.0 | 30 | 15 sec. | High | Polacolor 58 |
|  | C | — | — | 1 sec. | High | Black & White 57 |
| 40 | 4A | 4.6 | 39 | 15 sec. |  | Polacolor 58 |
| 41 | 5A | 4.7 | 30 | 15 sec. |  | Polacolor 58 |
| 42 | 6A | 5.9 | 33 | 15 sec. |  | Polacolor 58 |
|  | B | 16.0 | 30 | 15 sec. | Very High | Polacolor 58 |
|  | C | — | — | 1 sec. | Very High | Black & White 57 |
| 43 | 7A | 4.4 | >100 | 3 min. |  | Polacolor 58 |
|  | C | — | — | 1 sec. | Slight | Black & White 57 |
| 44 | 8A | 6.0 | 38 | 15 sec. |  | Polacolor 58 |

TABLE II-continued

| Example | Sample | Observations of Micrographs of TPE Compounds | | | | Film Type |
| | | Thickness mils | Light[1] Meter | Exposure Time | Birefringence | |
|---------|--------|-----|-----|--------|----------|-----|
| | C | — | — | 1 sec. | Moderate | Black & White 57 |

[1]Dial setting for full scale deflection. Low number = intense light.
[2]A - whole sample. B = insoluble portion. C - soluble portion.
[3]Crumbly films.

The thermoplastic elastomers of this invention can be modified by the admixture of fillers and/or extenders, such as calcium carbonate, hard clay, extender oils and the like, without undesirable effect on their physical or mechanical properties. In fact, as illustrated by the following examples, such modification often serves to strengthen and/or to improve the processability of thermoplastic elastomers, especially in compositions in which the EPDM represents 30-70% by weight of the polymeric material.

Thermoplastic elastomers can be extended with extender oil in an amount within the range of 0 to 100 parts by weight of extender oil per 100 parts by weight of polymer. The amount of filler may range from 0 to 100 parts by weight of filler per 100 parts by weight of polymer, as illustrated by the following Examples 46 to 50:

Physical Properties of Oil and Mineral Filled TPS's

|  | Example 46 | Example 47 | Example 48 | Example 49 | Example 50 |
|---|---|---|---|---|---|
| % EPDM | 30 | 40 | 40 | 40 | 40 |
| % Polypropylene | 60 | 50 | 50 | 50 | 50 |
| % HDPE | 10 | 10 | 10 | 10 | 10 |
| Oil (phr) | 100 | 50 | 50 | 50 | 50 |
| Hard Clay (phr) | — | 25 | 50 | — | — |
| CaCO$_3$ (phr) | — | — | — | 50 | 100 |
| Flex Modulus (psi) | 33,325 | 41,925 | 45,150 | 43,000 | 53,750 |
| Tensile (psi) | 1,400 | 1,250 | 1,325 | 1,250 | 1,175 |
| Elongation (%) | 30 | 120 | 50 | 120 | 90 |
| Comp. Set (%) | 90.0 | 89.8 | 90.2 | 91.1 | 89.4 |
| Die C Tear (lbs/in) | 240 | 370 | 370 | 365 | 830 |
| Spiral Flow (gms) (filled mold) | >15.7 | 11.7 | 11.6 | 11.7 | 11.5 | phr = parts per hundred of EPDM

It will be understood that changes may be made in the details of formulation and manufacture without departing from the spirit of the invention, especially as defined in the following claims.

We claim:

1. A thermoplastic elastomer formed of (1) an EPDM interpolymer of ethylene, monoolefin containing from 3 to 16 carbon atoms and a polyene, (2) a homopolymer of a monoolefin monomer containing from 3 to 16 carbon atoms, and (3) a polyethylene, in which the components are present in the amount of 4-15% by weight polyethylene, with the remainder of 96-85% by weight divided between the EPDM interpolymer and the monoolefin polymer in the ratio of 10-90 parts by weight EPDM interpolymer to 90-10 parts by weight of the monoolefin polymer, said components being subjected to a free radical reaction simultaneously during hot working in the presence of a free radical generating catalyst.

2. A thermoplastic elastomer as claimed in claim 1 in which the EPDM interpolymer is formed of monoolefins present in the ratio of 10-90 mole percent by weight ethylene to 90-10 mole percent by weight of a monoolefin containing 3 to 16 carbon atoms and in which the polyene is present in an amount to provide at least two carbon double bonds per 1000 carbon atoms.

3. A thermoplastic elastomer as claimed in claim 1 in which the monoolefin in the EPDM interpolymer is propylene.

4. A thermoplastic elastomer as claimed in claim 1 in which the monoolefin polymer is polypropylene.

5. A thermoplastic elastomer as claimed in claim 1 in which the monoolefin polymer is a copolymer of ethylene and propylene in which the bound ethylene is less than 10% by weight.

6. A thermoplastic elastomer as claimed in claim 1 in which the monoolefin in the EPDM interpolymer is propylene and in which the ethylene and propylene are present in the ratio of 55-85 mole percent ethylene to 45-15 mole percent propylene.

7. A thermoplastic elastomer as claimed in claim 1 in which the polyene is a polyunsaturated bridged ring hydrocarbon having at least one double bond in the bridged ring.

8. A thermoplastic elastomer as claimed in claim 7 in which the polyene is 5-alkylidene-2-norbornene.

9. A thermoplastic elastomer as claimed in claim 7 in which the polyene is 5-ethylidene-2-norbornene.

10. A thermoplastic elastomer as claimed in claim 7 in which the polyene is 1,4 hexadiene.

11. A thermoplastic elastomer as claimed in claim 1 in which the free radical generating catalyst is a peroxide.

12. A thermoplastic elastomer as claimed in claim 1 in which the free radical generating catalyst is present in an amount within the range of 0.05% to 4% by weight of the EPDM.

13. A thermoplastic elastomer as claimed in claim 1 in which the free radical catalyst is present in an amount within the range of 0.1% to 2% by weight of the EPDM.

14. A method for preparing a thermoplastic elastomer comprising combining an EPDM interpolymer, a polymer of a monoolefin having from 3 to 16 carbon atoms, and polyethylene present in an amount within the range of 4-15% by weight of the total of the monoolefin polymer, polyethylene and EPDM, hot working of the mixture in the presence of a free radical generating catalyst to effect a free radical reaction.

15. The method as claimed in claim 14 in which the materials are hot worked together at a temperature and time corresponding to at least three times the half-life of the catalyst.

16. The method as claimed in claim 14 in which the materials are hot worked together at a temperature and time corresponding to five to six times the half-life of the catalyst.

17. The method as claimed in claim 14 in which the polymer of a monoolefin having from 3 to 16 carbon atoms is polypropylene.

18. The method as claimed in claim 14 in which the polymer of a monoolefin having from 3 to 16 carbon atoms is a copolymer of ethylene and propylene containing less than 10% by eight bound ethylene.

19. The method as claimed in claim 14 in which the free radical generating catalyst is a peroxide catalyst.

20. The method as claimed in claim 14 in which the catalyst is present in an amount within the range of 0.05% to 4% by weight of the EPDM.

21. The method as claimed in claim 14 in which the catalyst is present in an amount within the range of 0.1% to 2% by weight of the EPDM.

22. The method as claimed in claim 14 in which the EPDM is an interpolymer of ethylene, a monoolefin containing 3 to 16 carbon atoms, and a polyene in which the ethylene and monoolefin are present in the ratio of 10-90 mole percent ethylene to 90-10 mole percent monoolefin and in which the polyene is present in the amount to provide at least two carbon to carbon double bonds per 1000 carbon atoms.

23. The method as claimed in claim 22 in which the polyene is present in the interpolymer in an amount to provide from 2 to 25 carbon to carbon double bonds per 1000 carbon atoms.

24. The method as claimed in claim 23 in which the monoolefin of the interpolymer is propylene and the ethylene and propylene are present in the ratio of 55-85 mole percent ethylene to 45-15 mole percent propylene.

25. The method as claimed in claim 17 in which the polyene present in the EPDM interpolymer is a polyunsaturated bridged ring hydrocarbon having at least one double bond in the bridged ring.

26. The method as claimed in claim 25 in which the polyene is 5-ethylidene-2-norbornene.

27. The method as claimed in claim 14 in which the polyethylene and the EPDM are subjected to a free radical reaction before addition of the polypropylene.

28. The method as claimed in claim 14 in which the polyethylene is grafted onto the EPDM during the free radical reaction.

29. The method as claimed in claim 14 which includes the admixture of a finely divided filler in an amount within the range of 0 to 100 parts by weight per 100 parts by weight of the polymeric material.

30. The method as claimed in claim 14 which includes the admixture of an extender oil in an amount within the range of 0 to 100 parts by weight per 100 parts by weight of the polymeric material.

31. A thermoplastic elastomer as claimed in claim 1 which includes finely divided filler admixed with the polymeric materials and present in an amount within the range of 0 to 100 parts by weight of filler to 100 parts by weight of polymeric material.

32. A thermoplastic elastomer as claimed in claim 1 which includes an extender oil admixed with the polymeric materials and present in an amount within the range of 0 to 100 parts by weight of extender oil to 100 parts by weight of polymeric material.

33. A thermoplastic elastomer as claimed in claim 1 which is sulfur cured.

* * * * *

UNITED STATES PATENT OFFICE
CERTIFICATE OF CORRECTION

Patent No. 3,957,919          Dated May 18, 1976

Inventor(s) George A. Von Bodüngen et al

It is certified that error appears in the above-identified patent and that said Letters Patent are hereby corrected as shown below:

column 1, line 32, delete "easily" of first instance and substitute --- and ---;

column 2, line 38, change "5595" to --- 55-95 ---;

column 2, line 48, delete "hexadiene" of second instance;

Signed and Sealed this

Twenty-eighth Day of September 1976

[SEAL]

Attest:

RUTH C. MASON
*Attesting Officer*

C. MARSHALL DANN
*Commissioner of Patents and Trademarks*